United States Patent [19]

Wiemer

[11] Patent Number: 5,549,737
[45] Date of Patent: Aug. 27, 1996

[54] SPRAY DEGASSER

[75] Inventor: Willem Wiemer, Delden, Netherlands

[73] Assignee: Stork Ketels B.V., Hengelo, Netherlands

[21] Appl. No.: 50,424

[22] PCT Filed: Nov. 11, 1991

[86] PCT No.: PCT/NL91/00227

§ 371 Date: May 17, 1993

§ 102(e) Date: May 17, 1993

[87] PCT Pub. No.: WO92/08534

PCT Pub. Date: May 29, 1992

[30] Foreign Application Priority Data

Nov. 19, 1990 [NL] Netherlands .................. 90.02521
Oct. 23, 1992 [WO] WIPO .............. PCT/NL91/00227

[51] Int. Cl.$^6$ ............................................. B01D 19/00
[52] U.S. Cl. ..................... 96/204; 96/206; 96/207; 96/215; 96/220
[58] Field of Search .................. 95/244, 260, 262; 96/181, 200, 203, 204, 206, 207, 214, 215, 220

[56] References Cited

U.S. PATENT DOCUMENTS

| | | | |
|---|---|---|---|
| 1,177,095 | 3/1916 | Fischer | 96/181 |
| 2,308,720 | 1/1943 | Sebald | 96/200 |
| 2,379,753 | 7/1945 | Sebold | 96/203 X |
| 2,452,716 | 11/1948 | Bergquist | 96/203 X |
| 2,490,294 | 12/1949 | Bergquist | 261/21 |
| 2,564,583 | 8/1951 | Sebold | 261/115 |
| 2,689,018 | 9/1954 | Kettredge | 96/203 X |
| 2,792,903 | 5/1957 | Hoff | 96/181 X |
| 2,845,137 | 7/1958 | Sebald | 95/244 |
| 2,990,030 | 6/1961 | McCoy et al. | 95/260 |
| 3,096,166 | 7/1963 | Kolthof et al. | 96/203 |
| 3,925,038 | 12/1975 | Wiemer et al. | 96/203 |
| 4,698,076 | 10/1987 | Bekedam | 96/203 X |

FOREIGN PATENT DOCUMENTS

| | | | |
|---|---|---|---|
| 2176157 | 10/1973 | France . | |
| 7203333 | 9/1973 | Netherlands . | |
| 332678 | 7/1930 | United Kingdom | 96/203 |

OTHER PUBLICATIONS

Lacey, M. G., et al., Deaerator design considerations, *Engineering and Boiler House Review* 76(12):410–417, 1961.

Primary Examiner—Robert Spitzer
Attorney, Agent, or Firm—Christensen O'Connor Johnson & Kindness PLLC

[57] ABSTRACT

The present invention relates to a spray degasser for removing gas from a liquid, comprising:

i) a boiler having at least one sprayer compartment, ii) the sprayer compartment comprises a radial sprayer which is connected to a liquid feed for spraying the liquid for degassing as a spray screen over the liquid present in the boiler, iii) a feed pipe for feeding into the liquid present in the boiler vapour to create in the sprayer compartment a gas containing vapour, iv) an outlet in the sprayer compartment for venting the gas removed from the liquid, and v) an outlet in the boiler for degassed liquid.

4 Claims, 3 Drawing Sheets

SPRAY DEGASSER

The invention relates in particular to a spray degasser for removing oxygen from water. Oxygen is an important factor which can result in corrosion in steam boilers and turbines. The problem of corrosion occurs particularly when work is done at high temperatures and pressures. Using a degasser the oxygen content in the water must be reduced in general to less than 10 ppb, preferably to less than 5 ppb.

In a known spray degasser the gas is separated from liquid in two steps. A first step is the so-called "scrub" step, wherein steam and water are brought into contact at generally equilibrium temperature and pressure, wherein the steam has a very low oxygen partial pressure. The water is degassed with this steam. The second step is the "heating" step, wherein almost all the steam condenses into water which is sprayed as a spray screen, wherein the water is brought to the equilibrium temperature. A small portion of the steam is discharged via an outlet using the released gases which do not condense under these conditions (see "Deaerating boiler feed water—The theoretical background" by G. S. Solt and W. Wiemer, and "The Stork spray type deaerator: design, development and experience" by W. Wiemer and G. S. Solt in Symposium on Degassing, 15 June 1978, pages 49–56 and 57–70 respectively).

A spray degasser with a radial sprayer is described for instance in FR-A-2 379 753.

U.S. Pat. No. 2,379,753 describes a water treatment and degassing apparatus having a series of annular cone sprayers in tangentially slanting arrangement for the purpose of generating a powerful water rotation in the underlying liquid. The cone-like spray screens are surrounded by a cylindrical partition. Steam can only pass laterally through the spray screens and via short-circuit openings between two adjoining cone spray screens and the partition into the space situated thereabove.

It will be apparent that the level of the partial oxygen pressure in the space above the spray screen determines the operation of the spray degasser. An improvement of the degassing action can be obtained by a further lowering of the partial oxygen pressure therein, which however requires an increase in the quantity of steam to be blown off, which is attended by greater heat losses.

Further research into a spray degasser has shown that the partial oxygen pressure of steam which passes through the spray screen is location-dependent. The temperature in the spray screen increases namely from the place where the spray screen is formed as a result of the condensation of steam passing therethrough. Steam which passes through the spray screen at a lower temperature will be richer in oxygen after passing through the screen than steam which passes through the spray screen at a higher temperature. By separately collecting the steam relatively enriched with oxygen and then blowing this off, the degassing action of the spray degasser can on the one hand be improved with the same quantity of blown off steam, thereby obtaining deeper degassing, while on the other hand, for the same degree of degassing, it can suffice to blow off a smaller quantity of steam, thereby reducing heat losses.

A spray degasser according to the invention is characterized in that the sprayer compartment comprises a gas compartment above and adjoining the colder spray screen, delimited by a gas compartment wall extending from a boiler wall to the colder spray screen, onto which the outlet in the sprayer compartment connects.

It is noted that steam which passes through the spray screen at a warmer location can also reach this compartment by again passing radially in counterflow through a spray screen that is becoming colder and as a result of further condensation reaches the compartment enriched with oxygen.

According to a preferred embodiment the compartment surrounds the sprayer.

In a practical embodiment the separating means comprise a compartment wall which extends from a boiler wall to the spray screen.

If in preference the compartment wall is provided at its free end facing towards the spray screen with a foot extending along the spray screen, the passage of steam is elongated radially in counterflow through the spray screen towards the compartment, which is associated with a further enrichment with oxygen. The foot preferably extends beyond the compartment.

Since the spray screen has a lowest temperature immediately after leaving the sprayer, and steam which passes through the spray screen at this location is thereby maximally enriched with oxygen, it is recommended that the compartment is located at a short distance from the sprayer.

If the spray screen has no splash plate or plates bounding its periphery, or if the steam passing radially through the spray screen must preferably be further enriched with oxygen, it can be advantageous if the degasser contains in addition to the first compartment another, second compartment which likewise adjoins the spray screen and adjoins the first compartment on the other side.

For constructional reasons it is recommended that the second compartment surrounds the first compartment.

Mentioned and other features of a spray degasser according to the invention will hereafter be better comprehended from the following description of a number of non-limiting embodiments of spray degassers according to the invention which are only given by way of example and to which the invention is in no way limited. In respect of these embodiments reference is made to the drawings, in which FIG. 1 shows a flow diagram for an electricity power station incorporating a spray degasser according to the invention;

Figure 1:
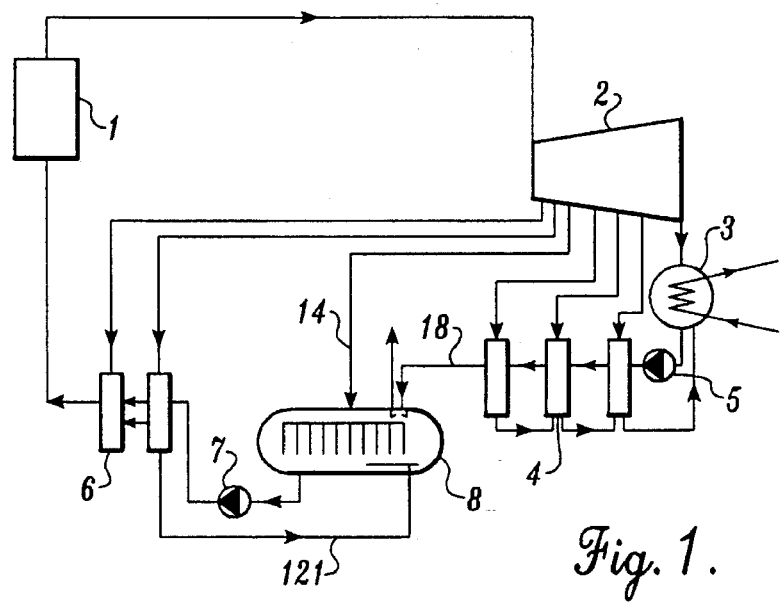

FIG. 1 shows a flow diagram for an electricity power station which comprises a steam boiler 1, a turbine 2, a condenser 3, a low pressure heating unit 4 which is connected to the condenser 3 via a pump 5, and a high pressure heating unit 6 which is provided with degassed water via the pump 7.

The spray degasser 8 according to the invention is situated between the low pressure heating unit 4 and the pump 7.

Figure 2:
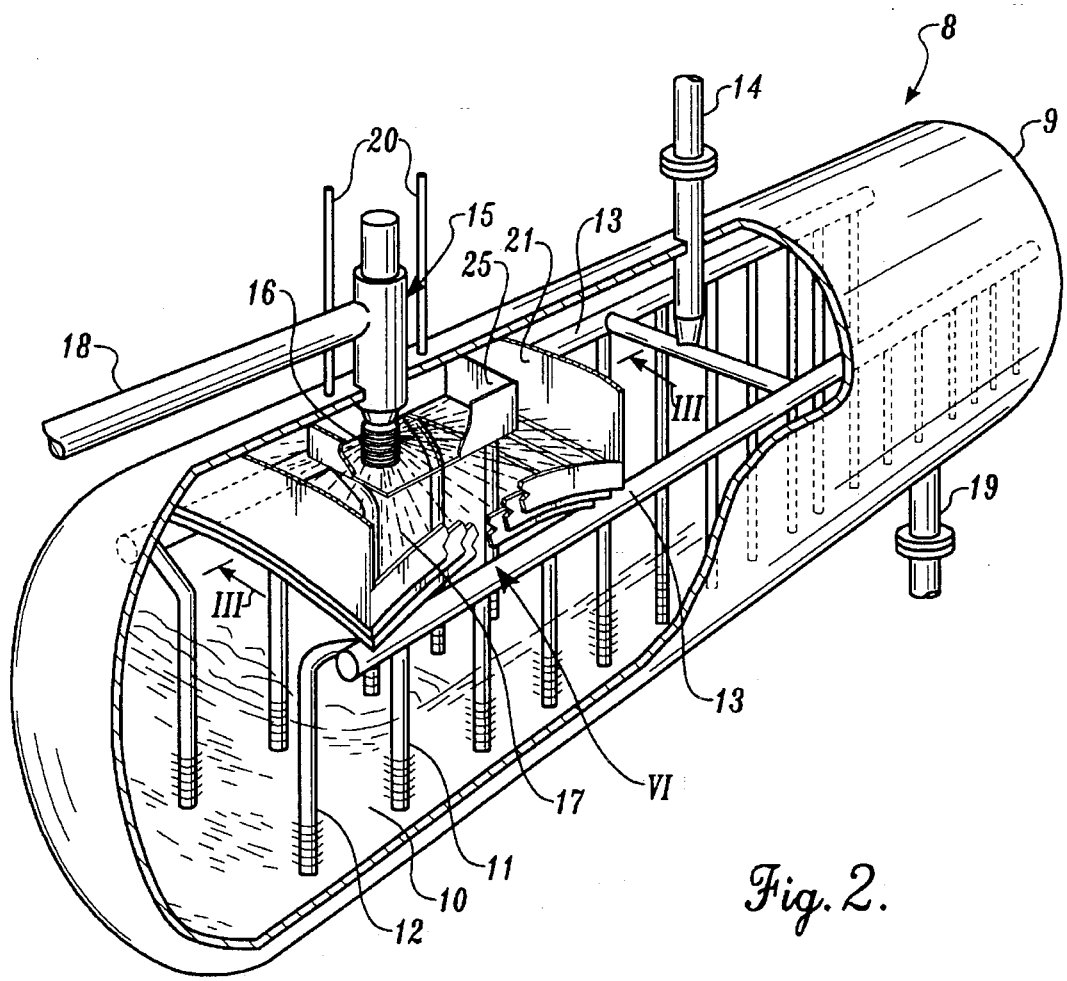
FIG. 2 shows a perspective partially broken away view of a spray degasser according to the invention from FIG. 1.

The spray degasser 8 (see FIG. 2) comprises a boiler 9 partially filled with liquid 10, in this case water. Reaching into the water 10 are steam pipes 11 which are provided in the portion thereof protruding into the water with holes out of which steam enters the liquid. The steam pipes 11 are connected to a steam conduit 13 which is connected to a vapour feed 14, in this case a steam feed 14, which is connected to the turbine 2.

The boiler 9 is further provided with spray means 15 which comprise a per se known sprayer 16 with which is formed a number of spray screens 17 lying one above the other. The spray means 15 further comprise a feed 18 for liquid for degassing which is connected to the low pressure heating unit 4.

In addition the boiler 9 is provided with an outlet 19 for degassed liquid and, finally, with outlets 20 for discharging removed gas into the atmosphere. Finally, it is possible via the pipe 121 to carry condensate from the high pressure heating unit 6 back to the degasser 8.

Figure 3:
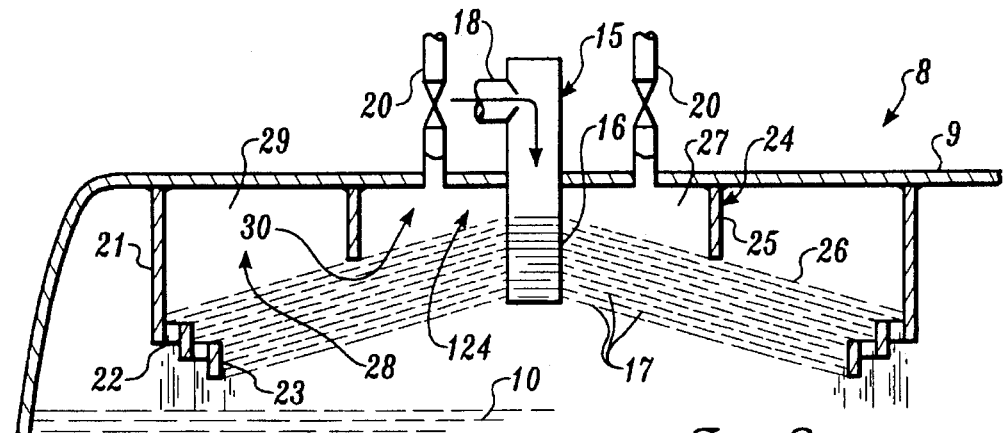
FIG. 3 is a section along the line III—III from FIG. 2.

The spray degasser 8 according to the invention will be discussed in more detail with reference to FIG. 3.

Using the sprayer 16 a number of spray screens 17 are generated which are bounded on their periphery by a splash screen 21 and concentric splash rings 22 and 23 arranged thereon, from which the water falls downward.

Using separating means 24 according to the invention, in this case using a compartment wall 25 which reaches to the top spray screen 26 without thereby substantially coming into contact therewith, a compartment 27 is separated from the space above the spray screens. The spray screens 17, 26 have a colder region 17a proximal to the sprayer 16 and a warmer region 17b distal to the gas compartment wall 25. The outlets 20 for gas removed from the liquid debouch into this compartment 27. Steam 124 which is injected via the steam pipes 11, can reach the compartment 27 directly after passing through the spray screens 17, 26. Steam 28 which has entered the remaining space 29 via the warmer spray screen portions, can reach the compartment 27 indirectly by going under the compartment wall 25 through the colder spray screens as according to the arrow 30. Steam thus enters the compartment 27 which is relatively rich in gas removed from the liquid, in this case oxygen.

Figure 4:
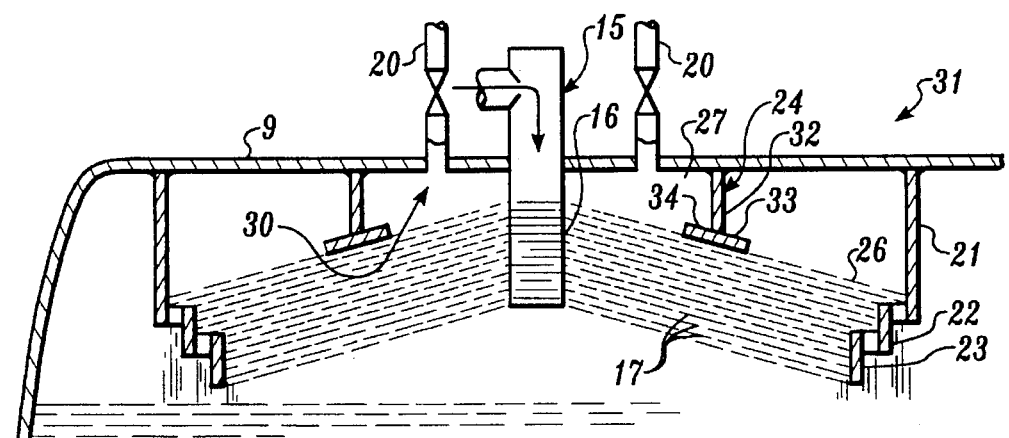
FIGS. 4, 5 and 7 show sections corresponding with FIG. 3 of other embodiments.

FIG. 4 shows a degasser 31 according to the invention. In this case the separating means 24 according to the invention comprise a compartment wall 32 which separates the compartment 27 around the sprayer 16, and is provided at its end 33 facing towards the spray screens 17, 26 with a foot 34 which extends along the spray screen 26 into and outside of the compartment 27, while the spray screen 26 is not substantially disturbed. Steam which enters the compartment 27 indirectly as according to the arrow 30 is thus constrained to opt for a longer path through colder spray jet portions.

Figure 5:
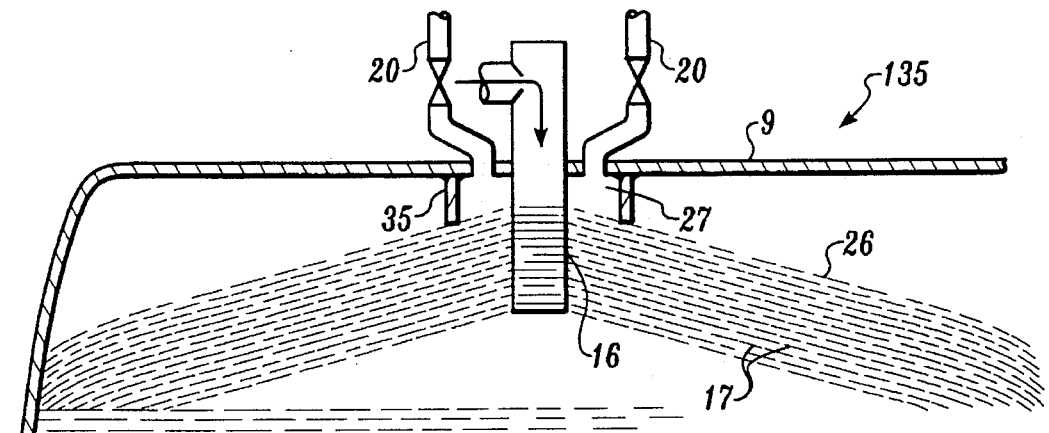

FIG. 5 shows a spray degasser 135 according to the invention in its most-simple form. Omitted in this case are means for bounding the spray screens 17 and 26, in particular the splash screen 21 and the splash rings 22 and 23, The advantages according to the invention can nevertheless be obtained because the compartment 27 from which gas separated from the liquid is removed via the outlets 20 is separated off around the sprayer 16, using a compartment wall 35 at a short distance therearound.

Figure 6:
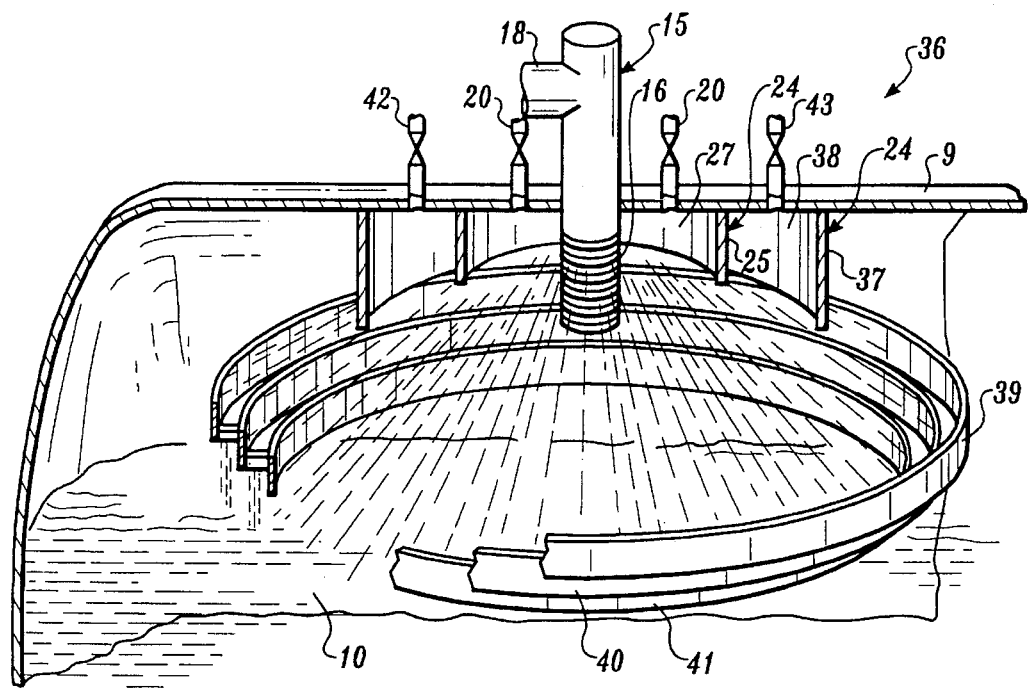
FIG. 6 is a perspective view of a variant of detail VI from FIG. 2.

FIG. 6 shows another spray degasser 36 according to the invention with which a compartment 27 is separated of around the sprayer 16 using the compartment wall 25 comprised of the separating means 24. In this case the separating means 24 according to the invention comprise a second compartment wall 37 with which a second compartment 38 is separated around the first compartment 27. Further omitted is the splash screen 21 but splash rings 39, 40 and 41 are retained. Preferably only gas with a small quantity of steam is removed from the compartment 27. If desired, it is likewise possible to discharge gas-enriched steam out of the compartment 38 via the gas outlets 42 and 43.

Figure 7:
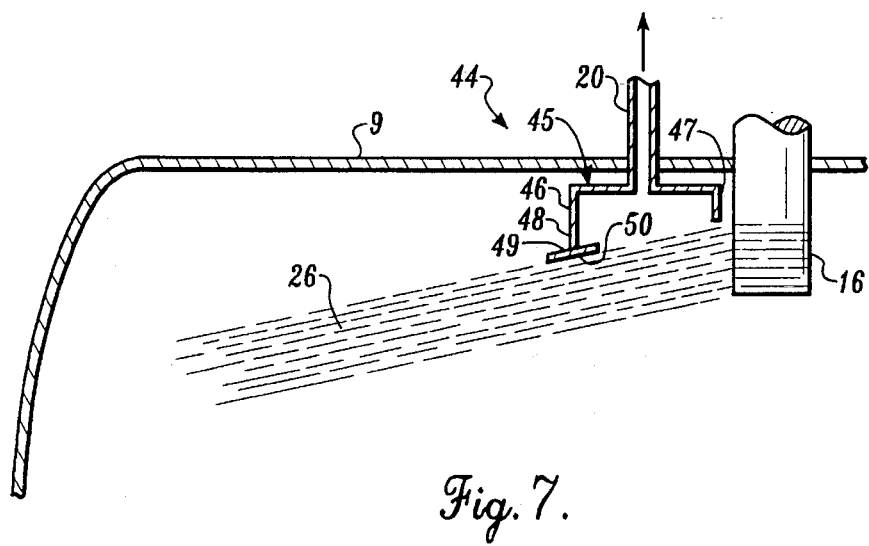

Finally, FIG. 7 shows a spray degasser 44 according to the invention. The compartment 45 has the form of an annular container 46 open to the bottom, which surrounds the sprayer 16. The sprayer 16 extends through and beyond a central container opening 4. An outer peripheral edge 48 is provided at the free end 49 with a foot 50. The container is fixed to the outlets 20. The container 46 thus hangs free of the boiler 9 above the spray screen 26.

Although the spray degasser is only described for degassing water in combination with its vapour phase steam, it will be apparent that other liquids can also be degassed insofar as use can be made of their vapour phase. For example, lower alcohols can be degassed in the same manner of non-condensing gases, such as oxygen, nitrogen and the like.

I claim:

1. A radial spray degasser for removing noncondensable gas from a liquid to be degassed, the degasser comprising:

(a) a boiler having a boiler structure;

(b) an inner spray compartment, the spray compartment located in an upper portion of the boiler, the spray compartment comprising:

(i) a surrounding wall defining the inner sprayer compartment, the wall extending downward from the structure of the boiler so that lower edges of the wall are in contact with an upper portion of a spray screen of liquid being degassed when the degasser is in use;

(ii) a radial sprayer located within the inner spray compartment at a distance from and surrounded by the surrounding walls, the sprayer having a first end and a second end, the first end connected to an inlet conduit for supplying liquid to be degassed to the radial sprayer, the second end extending into the inner spray compartment with liquid outlets, for spraying of liquid to be degassed radially outward in a spray screen, located above the lower edges of the surrounding wall; and (iii) an outlet extending from an upper portion of the inner spray compartment for venting noncondensable gasses that accumulate in said compartment;

(c) an outer compartment defined by walls spaced from and surrounding the inner compartment, the walls of the outer compartment extending downward from the boiler structure, said walls of sufficient length to intercept an outer circumferential edge of the spray screen of the radial sprayer, said walls of the outer compartment extending further downward into the boiler than the surrounding walls of the inner sprayer compartment;

(d) steam pipes having perforated lower extremities extending into the boiler such that the perforated extremities are submerged in liquid and steam exiting from the pipes is able to bubble through the liquid and travel upward to the spray screen to degas liquid of said spray screen when the boiler is in use; and (e) an outlet of the boiler for removing degassed liquid from the boiler;

whereby, when the degasser is in use, steam containing noncondensable gasses stripped from the liquid accumulates in a space between the walls of the inner spray compartment, and the distance between the radial sprayer and the surrounding walls of the inner spray compartment is such that steam and gasses crossflow from the outer compartment through the spray screen of liquid into the inner spray compartment, the liquid thereby undergoing further degassing, before the gasses vent from the degasser.

2. The boiler of claim 1, wherein a foot extends along the lower edges of the walls of the outer surrounding compartment, the foot angled so that a spray screen from the radial sprayer is not substantially disturbed and so that steam and noncondensable gasses entering the inner compartment from the outer surrounding compartment are constrained to travel around the foot.

3. A radial spray degasser for removing noncondensable gas from a liquid to be degassed, the degasser comprising:

(a) a boiler having a boiler structure;

(b) a single sprayer compartment disposed in an upper portion of the boiler, the sprayer compartment comprising:
  (i) a single surrounding wail defining the compartment, the wall extending downward from the structure of the boiler so that lower edges of the wall are in touching relation with an upper portion of a spray screen when the degasser is in use;
  (ii) a radial sprayer located within the inner spray compartment and a distance from the wall, the sprayer extending downward into the compartment for spraying liquid to be degassed as a spray screen radially outward and downward, the liquid outlets of said sprayer located at a level above the lower edges of the walls defining the compartment; and
  (iii) an outlet from the compartment for venting noncondensable gasses accumulating in the compartment, when the degasser is in use;

(c) steam pipes having perforated lower extremities extending into the boiler so that the perforated extremities are submerged in liquid and steam exiting from the pipes is able to bubble through the liquid and travel upward to the spray screen to degas liquid of said spray screen when the boiler is in use; and (d) an outlet extending from the boiler for removing degassed liquid from the boiler;

whereby, when the degasser is in use, a portion of steam and noncondensable gasses stripped from the liquid being degassed are constrained, due to the distance between the radial sprayer and the surrounding wall, to crossflow beneath the walls of the compartment, counter to the spray screen, thereby causing the steam and noncondensable gasses to contact a coldest portion of the spray screen to further strip gasses from the liquid and condense steam.

4. A radial spray degasser for removing noncondensable gas from a liquid, the degasser comprising:

(a) a boiler having a boiler structure;

(b) a radial sprayer extending downward into an upper portion of the boiler, the sprayer able to spray liquid to be degassed in a spray screen radially outward and downward;

(c) two spaced apart walls defining an annular space between, the space capped with a roof to form a compartment, the walls surrounding the radial sprayer and spaced from said sprayer, a wall further from the sprayer extending further downward into the boiler than a wall closer to the sprayer, the wall closer to the sprayer spaced from the sprayer, both of said two spaced apart walls extending downward such that lower edges of the walls touch a spray screen from the radial sprayer, when the degasser is in use;

(d) steam pipes having perforated lower extremities extending into the boiler such that the perforated extremities are submerged in liquid and steam exiting from the pipes is able to bubble through the liquid and travel upward to the spray screen to degas liquid of said spray screen when the boiler is in use;

(e) a vent for nondensable gasses extending through the roof of the compartment to vent gasses to outside the boiler; and (f) an outlet of the boiler for removing degassed liquid from the boiler.

\* \* \* \* \*